(12) United States Patent
Oster et al.

(10) Patent No.: US 6,195,038 B1
(45) Date of Patent: Feb. 27, 2001

(54) METHOD OF AUTOMATICALLY DETERMINING THE POSITION OF VEHICLES

(75) Inventors: Martin Oster, Königsbrunn; Peter Weisbier; Günter Schiehser, both of Vienna; Wolfgang Grande, Hintersdorf, all of (AT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/199,110

(22) Filed: Nov. 24, 1998

(30) Foreign Application Priority Data

Nov. 26, 1997 (DE) ................................ 197 52 361

(51) Int. Cl.[7] ............................. H04B 7/185; G01S 5/02
(52) U.S. Cl. ...................................... 342/357.03; 701/215
(58) Field of Search ........................ 342/357.03; 701/215

(56) References Cited

U.S. PATENT DOCUMENTS 5,689,431   11/1997   Rudow et al. .

OTHER PUBLICATIONS

"Automatic Vehicle Location System" Electrical Communication, 2 Quartal, 1994, Paris France by Bethmann et al, pp. 129–135.
"Differential GPS Markets in the 1990's" by Lewis. Proceedings of Electro International, Jun. 21, 1995, IEEE, New York, US. pp. 163–186.
"AVLS—A System for Automatically Determinign the Position of Vehicles" by A. Bethmann et al. 1994 Alcatel SEL. Stuttgart, pp. 129–135.

*Primary Examiner*—Theodore M. Blum
(74) *Attorney, Agent, or Firm*—Ware, Fressola, Van Der Sluys & Adolphson LLP

(57) ABSTRACT

A method of automatically determining the position of vehicles by means of the DGPS (Differential Global Positioning System) is proposed, whereby at least one vehicle in the local public passenger traffic and one fixed station receive GPS data which characterize the distance to GPS satellites, where the data of the fixed station are transmitted as correction data 8 via service radio telegrams 5 to the mobile station 6 in the vehicles 1, and where the transmission of the correction data 8 takes place through expansion of the service radio telegrams 5 by at least one information byte 9.

10 Claims, 3 Drawing Sheets

| MSB | | | | | | | LSB | info byte | |
|---|---|---|---|---|---|---|---|---|---|
|  |  |  |  | 1 | 2 | 1 | 2 |  | ⎫ |
| 1 | 0 | 0 | 1 | 1 | 1 | 1 | 1 | 1 | ⎬ 9 |
| 3 | 4 | 5 | 6 | 7 | 8 | 9 | 10 |  | ⎪ |
| 1 | 1 | 1 | 1 | 1 | 1 | 1 | 1 | 2 | ⎪ |
| 1 | 2 | 3 | 4 | 1 | 2 | 3 | 4 | TL = 15 | ⎪ |
| 0 | 0 | 0 | 1 | 1 | 1 | 1 | 1 | 3 | ⎭ |
| 1 | 2 | 3 | 4 | 5 | 6 | 7 | 8 |  |  |
| DT | | | | | | | | 4 |  |
| 1 | 2 | 3 | 4 | 5 | 6 | 7 | 8 |  |  |
| HR | | | | | | | | 5 |  |
| 1 | 2 | 3 | 4 | 5 | 6 | 7 | 8 |  |  |
| MI | | | | | | | | 6 |  |
| 1 | 2 | 3 | 4 | 5 | 6 | 7 | 8 |  |  |
| SC | | | | | | | | 7 |  |
|  | 1 | 2 | 1 | 2 | 3 | 4 | 5 |  |  |
| 0 | NR | | MZC ... | | | | | 8 |  |
| 6 | 7 | 8 | 9 | 10 | 11 | 12 | 13 |  |  |
| ... MZC | | | | | | | | 9 |  |
|  |  | 1 | 1 | 2 | 3 | 4 | 5 |  |  |
| 0 | 0 | SF | SID | | | | | 10 |  |
| 1 | 2 | 3 | 4 | 5 | 6 | 7 | 8 |  |  |
| PRC... | | | | | | | | 11 |  |
| 9 | 10 | 11 | 12 | 13 | 14 | 15 | 16 |  |  |
| ...PRC | | | | | | | | 12 |  |
| 1 | 2 | 3 | 4 | 5 | 6 | 7 | 8 |  |  |
| RRC | | | | | | | | 13 |  |
| 1 | 2 | 3 | 4 | 5 | 6 | 7 | 8 |  |  |
| IOD | | | | | | | | 14 |  |
|  |  | 1 | 1 | 2 | 3 | 4 | 5 |  |  |
| 0 | 0 | SF | SID | | | | | 15 |  |
| 1 | 2 | 3 | 4 | 5 | 6 | 7 | 8 |  |  |
| PRC... | | | | | | | | 16 |  |
| 9 | 10 | 11 | 12 | 13 | 14 | 15 | 16 |  |  |
| ...PRC | | | | | | | | 17 |  |
| 1 | 2 | 3 | 4 | 5 | 6 | 7 | 8 |  |  |
| RRC | | | | | | | | 18 |  |
| 1 | 2 | 3 | 4 | 5 | 6 | 7 | 8 |  |  |
| IOD | | | | | | | | 19 |  |

METHOD OF AUTOMATICALLY DETERMINING THE POSITION OF VEHICLES

TECHNICAL FIELD

The invention is directed to a method of automatically determining the position of vehicles by means of a DGPS (Differential Global Positioning System) wherein at least one vehicle in the ÖPNV (Local Public Passenger Traffic) and a fixed station (2) receive GPS (Global Positioning Systems) data, which characterize the distance to GPS satellites, where the GPS data from the fixed station are transmitted as correction data via service radio transmissions to the mobile stations in the vehicles, and wherein the transmission of the correction data takes place through expansion of the service radio transmissions by at least one information byte.

BACKGROUND OF THE INVENTION

From the technical article "AVLS—A system for automatically determining the position of vehicles" by A. Bethmann et al., 1994, Alcatel SEL, Stuttgart, it is known to use a number of position determination possibilities to compute the exact location of vehicles. The GPS Global Positioning System is used to that end for example. The system comprises 25 satellites, not all of which are still active however. The accuracy of the location is approximately 100 meters for private users. The determination of the position is based on the direct distance measurement between satellites and vehicular receiver by means of the half-wave time delay measurement method with synchronized time reference. Inaccuracies must be expected, because ionospheric disturbances affect the signal propagation time, and atmospheric disturbances and damping limit the availability of the signal. Multipath reception furthermore causes positioning errors, particularly in a city environment. Signal shading is possible in tunnels.

The problems with the global positioning system are partly avoided when a differential method is used. A GPS receiver is installed in a known reference location. This reference receiver is able to determine very accurately the distance from its location to the satellites. In the vehicles these distances are now compared with the distances measured in the vehicles. This determines the errors in the distance measurement and thereby improves the result of the measurement. With this method the positioning accuracy can be increased to 10 meters in the horizontal direction. The above-cited technical article also discusses the type of data transmission between the fixed station and the mobile devices. The use of (PMR=Private Mobile Radio) service radio for communication by the mobile stations with the fixed station is discussed as an example of a solution. Service radio networks are widely used, particularly in local public traffic, but their data capacity cannot be expanded to any desired extent.

SUMMARY OF THE INVENTION

Therefore the object exists to integrate the advantages of the differential position determination GPS into existing motor pools by using existing service radio networks for exchanging the relevant data.

The method of the invention is a method of automatically determining the position of vehicles by means of a DGPS method (Differential Global Positioning System), whereby at least one vehicle in the ÖPNV (Local Public Passenger Traffic) and a fixed station receive GPS (Global Positioning Systems) data, which characterize the distance to GPS satellites, where the GPS data from the fixed station are transmitted as correction data via service radio transminssions to the mobile stations in the vehicles, and wherein the transmission of the correction data takes place through expansion of the service radio transmissions by at least one information byte. This method has the advantage that by including the GPS data of the fixed station in a service radio telegram, the correction data needed to compute an accurate position are transmitted to the mobile station. The system to carry out the method requires no replacement of the already existing infrastructure and no change in the provided service radio protocols. The relevant correction data are redirected inside of individual information bytes to the mobile station in the vehicle.

It is particularly advantageous that the method can be built without great expense into the quasi norm 420 of the VDV (Association of German Traffic Entrepreneurs).

It is furthermore possible to insert in a simple manner up to 15 additional information bytes into the data frame of the structure provided by the VDV protocol. It is an advantage that an information byte is transmitted by signalling whether correction data are sent by a satellite, and if so by one or by two satellites. In addition, the entire information required to correct the position, such as alignment rates, times, scale factors etc., is transmitted in the information bytes.

BRIEF DESCRIPTION OF THE DRAWINGS

An embodiment of the invention is illustrated in FIG. 1 and is explained in greater detail in FIGS. 2 and 3, wherein:.

FIG. 3 illustrates the data structure of the information bytes.

BEST MODE FOR CARRYING OUT THE INVENTION

Figure 1:
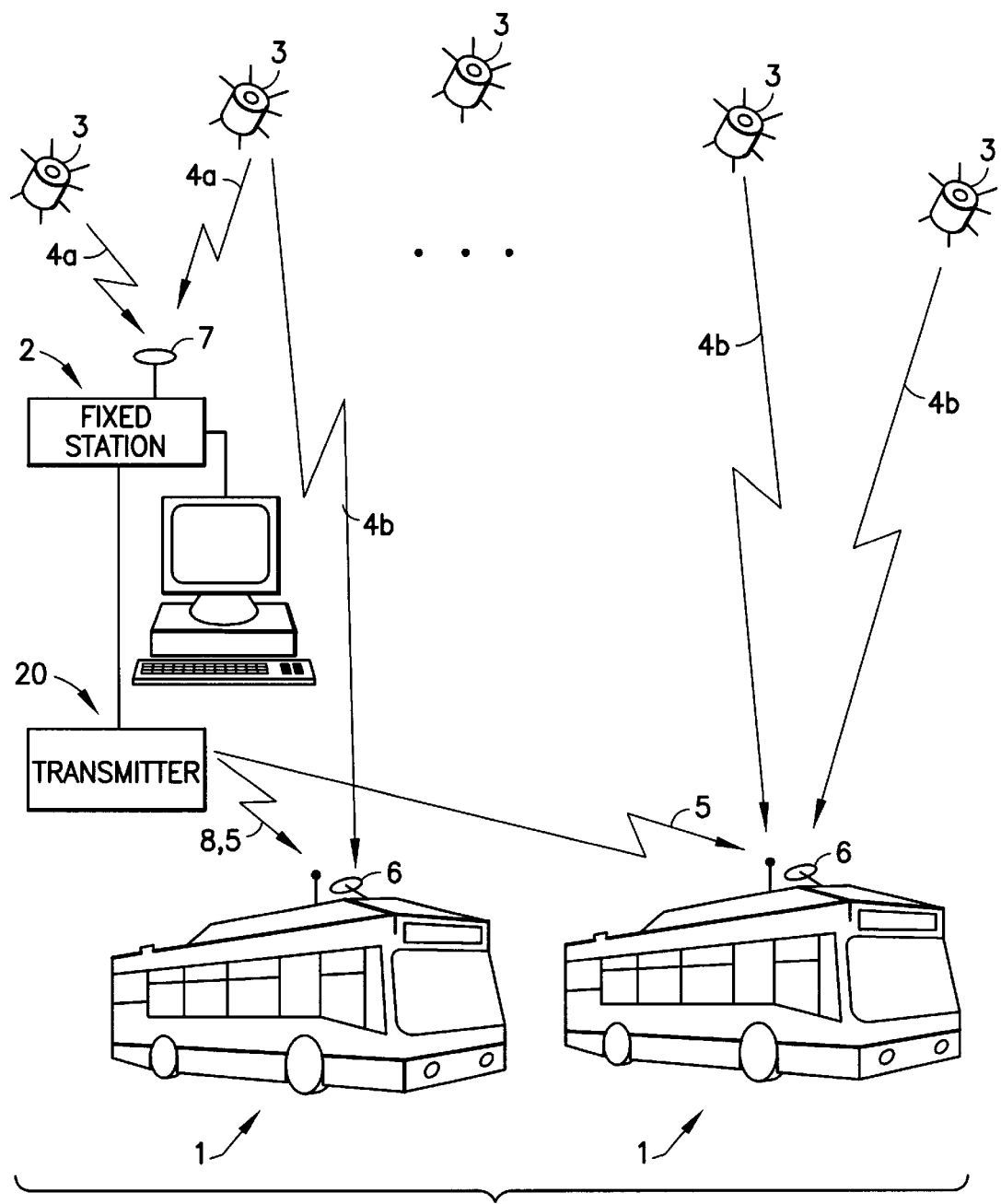
FIG. 1 schematically illustrates the construction of a communications network.

FIG. 1 illustrates an example of two vehicles 1 which are in touch with the fixed station 2 via mobile stations 6. The connection to the fixed station 2 is established via service radio transmissions 5 via transmitter 20. In addition the vehicles 1 contain mobile stations 6 which are used to receive the positioning signals 4b from the satellites 3. The mobile station 6 receives the positioning signals 4b from the satellites 3. To be able to utilize the advantages of the differential GPS method, the fixed station 2 evaluates the GPS signals 4a it receives, and sends these signals to the vehicles 1 via the service radio transmissions 5. In this way the mobile stations 6 in the vehicles receive two complete data sets for determination of the position, namely the data 4b they measured themselves, as well as the correction data 8 that were transmitted by the fixed station 2 via the service radio channel. The correction data 8 are essentially identical to the position data 4a measured by the fixed station, but since the service radio transmissions cannot be of any desired size, they must be transmitted in several units and thus represent a special prepared form of the data set. If both complete data sets 4a and 4b are available in the vehicle, the mobile station 6 can undertake a differential computation and determine the position of the vehicle with great accuracy.

Figure 2:
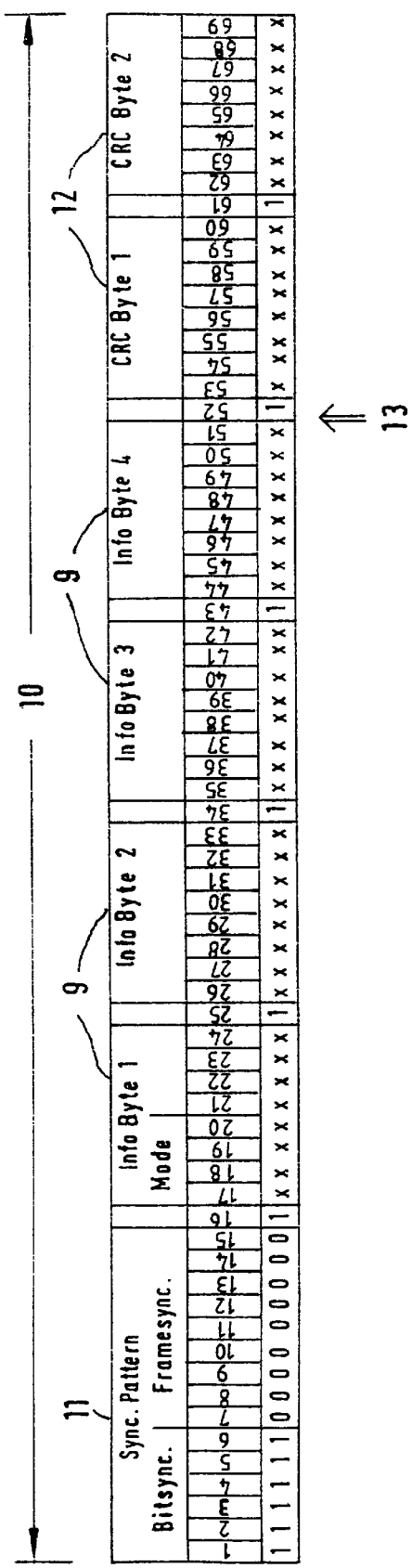
FIG. 2 illustrates the data frame structure of the service radio telegram.

The service radio telegram 5 maintains the communication between the mobile and the fixed station and is used to transmit the GPS data 4a of the fixed station. The service radio telegram 5 comprises a data frame 10 which includes several sections. As best seen in FIG. 2, the data frame begins with a synchronization pattern 11 that contains information for synchronizing the fixed and the mobile station. A sequence of information bytes 9 follows, the first three of which are firmly defined and cannot be loaded with additional information. By contrast the fourth information byte, as well as every further information byte that can be inserted into the data frame after bit location 13, is available for transporting information. Two control bytes 12 terminate the data frame. A stuffing bit is transmitted between each of the individual information bytes 9. The two CRC (Cyclic Redundancy Check) control bytes 12 are used to check the quality of the data channel and call attention to faulty transmissions. The information bytes 1 to 4 are used to transmit information about the type of service radio telegram and the length of the telegram. It is possible to insert 15 additional information bytes which follow the four originally defined information bytes.

FIG. 3 provides details about the structure of the information bytes with the consecutive numbers of 1 to 19. The first three information bytes transmit the TY information about the type of telegram as well as TL, the length of the telegram. Various information is inserted into the subsequent information bytes 9:

DT (Day Type) defines the actual data HR (Hour of actual time), MI (Minutes of actual time), SC (Seconds of actual time), where all of these data are used for tuning the actual times between the fixed and the mobile station. The eighth information byte includes an information NR (Number of satellites) which within a length of 2 bits signals whether data from one satellite or two satellites or no satellites are being transmitted. The next-in-line data MZC (Modified Z-Count) include data for both of the possible satellite data that can be transmitted with this telegram. These data contain the reference to the GPS time with a scaling factor of 0.6 seconds. The tenth information byte uses SF (Scale Factor) to transmit the scaling factor for both the Pseudo Range Correction (PRC) as well as the Range Rate Correction (RRC). The information SID (Satellite ID) is used to identify the satellite. Subsequently PRC and RRC are used to transmit the data content of the sighted satellite. The IOD field is located in the fourteenth information byte and contains information about the ephemeral position of the satellite. The data of the second satellite are transmitted in the fifteenth to the nineteenth information bytes, analogously to the first satellite. After transmitting a maximum of 6 service radio transmissions structured as illustrated in FIG. 3, the complete reference data from 12 satellites have been transmitted to the mobile station.

The data structure illustrated in FIG. 3 represents one possible data structure. It is of course also possible to transmit the required information and data in a different sequence and with a different structure, but the boundary conditions of the VDV protocol must be maintained.

The enormous advantage of the proposed method is its simple integration into already existing service radio networks which observe the VDV standard. The additional information can be included in a simple manner, while any further processing takes place in the mobile station itself by means of an intelligent GPS receiver.

What is claimed is:

1. A method of automatically determining the position of vehicles (1) by means of a DGPS method (Differential Global Positioning System), whereby at least one vehicle (1) in the ÖPNV (Local Public Passenger Traffic) and a fixed station (2) receive GPS (Global Positioning Systems) data, which characterize the distance to GPS satellites (3), where the GPS data (4a) from the fixed station are transmitted as correction data (8) via service radio transmissions (5) to the mobile stations (6) in the vehicles (1), wherein the transmission of the correction data (8) takes place through expansion of at least one information byte (9) of data frames (10) of a data structure of the service radio transmissions (5) in accordance with the Private Mobile Radio (PMR) VDV Association of German Traffic Entrepreneurs protocols.

2. A method of automatically determining the position of vehicles as claimed in claim 1, characterized in that up to 16 additional information bytes (9) are inserted into the data frames (10) of the service radio transmissions (5).

3. A method of automatically determining the position of vehicles as claimed in claim 2, characterized in that the additional information bytes (9) contain the GPS data (4a) received by the fixed station (2) from at least one satellite (3).

4. A method of automatically determining the position of vehicles (1) as claimed in claim 3, characterized in that one of the information bytes (9) signals whether correction data and if-yes data are transmitted by one or by two satellites (3).

5. A method of automatically determining the position of vehicles (1) as claimed in claim 4, characterized in that data for aligning, dating, scaling as well as the position data are transmitted in the information bytes (9).

6. A method of automatically determining the position of vehicles as claimed in claim 1, characterized in that additional information bytes (9) are inserted into the data frames (10) of the service radio transmissions (5).

7. A method of automatically determining the position of vehicles as claimed in claim 1, characterized in that additional information bytes (9) contain the GPS data (4a) received by the fixed station (2) from at least one satellite (3).

8. A method of automatically determining the position of vehicles (1) as claimed in claim 1, characterized in that one of the information bytes (9) signals whether correction data and if-yes data are transmitted by one or by two satellites (3).

9. A method of automatically determining the position of vehicles (1) as claimed in claim 1, characterized in that data for aligning, dating, scaling as well as the position data are transmitted in the information bytes (9).

10. The method of claim 1 wherein the service radio transmissions are in further accordance with quasi norm 420 of the Association of German Traffic Entrepreneurs protocols.

* * * * *